Patented Feb. 1, 1927.

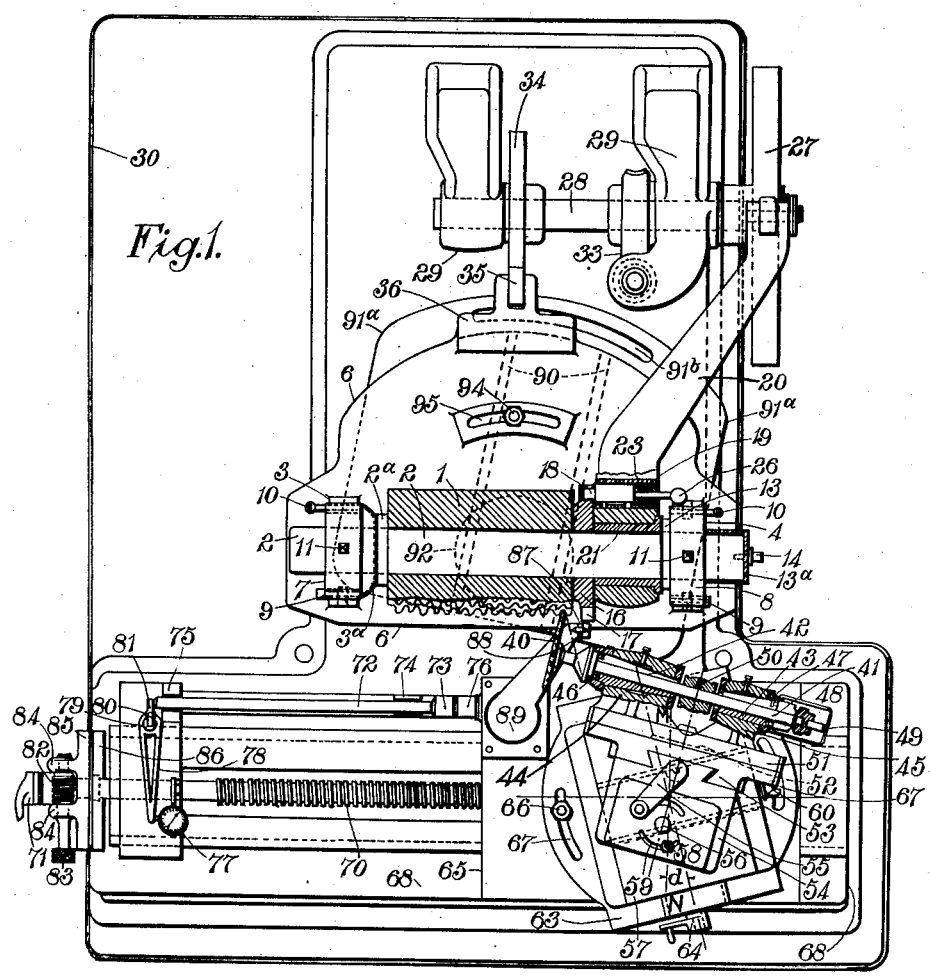

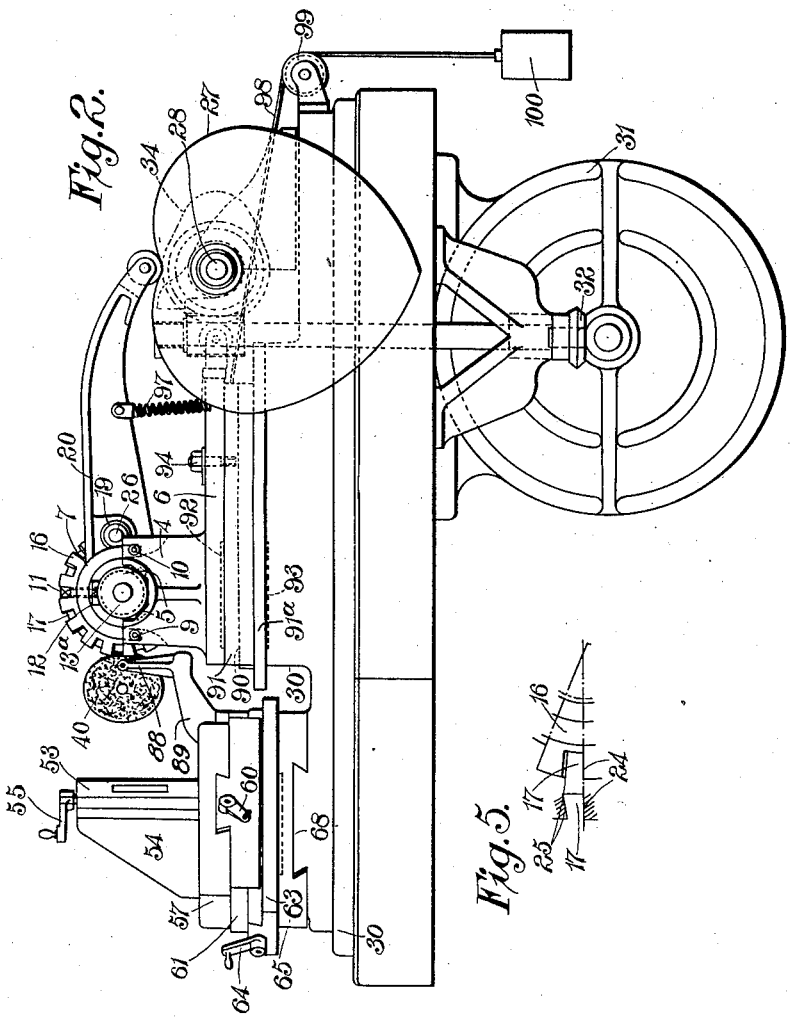

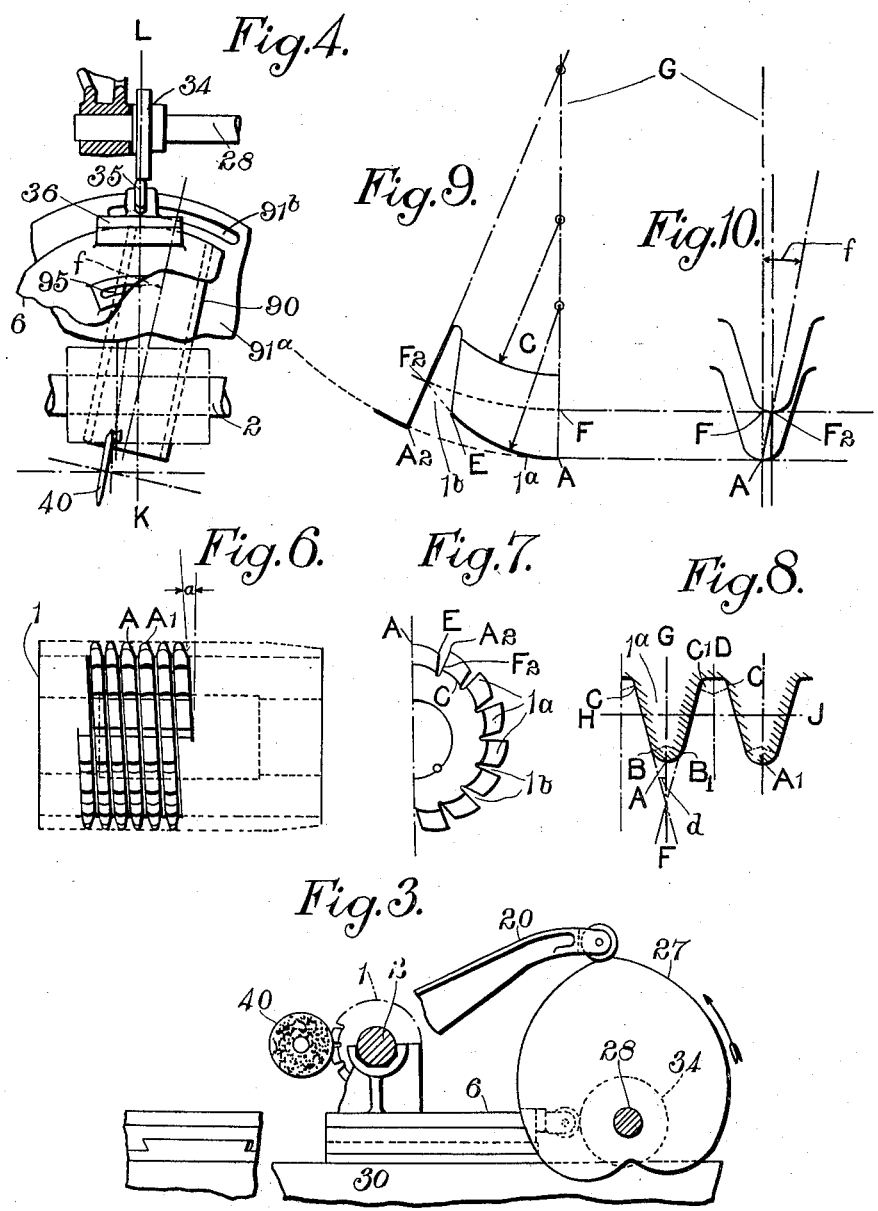

1,616,056

UNITED STATES PATENT OFFICE.

HOLBERRY MENSFORTH, OF BOWDON, AND FREDERICK ARTHUR COWELL, OF SALE, ENGLAND, ASSIGNORS, BY MESNE ASSIGNMENTS, TO WESTINGHOUSE ELECTRIC & MANUFACTURING COMPANY, A CORPORATION OF PENNSYLVANIA.

GRINDING APPARATUS FOR HOBS.

Application filed July 15, 1921, Serial No. 484,983, and in Great Britain August 21, 1920.

This invention relates to a method of and apparatus for accurately grinding to the required dimensions and shape, the teeth of hobs and like tools employed for the cutting of pinions and gear wheels.

In grinding apparatus heretofore frequently employed for this purpose, the hardened hob or tool is carried on a table and continuously rotated in relation to a grinding wheel which is mounted on a slide movable in a longitudinal direction by means of a lead screw, the continuous rotation of which, corresponding to the lead of the hob teeth, enables a similar part of each of the teeth to be consecutively ground. To enable the cutting clearance or so-called relief to be given to the teeth, a transverse reciprocating motion is imparted to the table which carries the hob.

In such apparatus the precision of the motion and location of the grinding wheel depends largely upon the accuracy of the lead screws which are difficult to manufacture with the required accuracy and are also liable to become worn. Also, provision is not made for maintaining a good cutting edge on the grinding wheel.

The object of the present invention is to provide an improved method of and apparatus for grinding with greater precision than has heretofore been possible, not only the exact profile dimensions of each tooth but also the additional relief curvature at the back of the teeth to a specified relief and a further object is to obviate all possibility of inaccuracy due to the employment of a lead screw for determining the position of the grinding wheel with relation to the teeth of the hob.

According to the invention, gauges of definite length are used for locating the grinding wheel independently of a lead screw and with great precision in predetermined fixed positions for the separate grinding of each individual tooth, the hob being turned angularly the peripheral length of one tooth instead of being rotated continuously. During the grinding of each tooth, in addition to the transverse reciprocating movement imparted to the hob which provides the necessary relief, there is also imparted a longitudinal motion corresponding in amount with the lead of the hob. In conjunction with the means for locating the grinding wheel longitudinally, there is provided a diamond for truing the cutting face of the grinding wheel, the position of the said diamond constituting a datum or basic point for the accurate adjustment of the position of the grinding wheel.

To enable the invention to be clearly understood a convenient construction of grinding apparatus having the invention applied thereto will now be described by way of example, with reference to the accompanying drawings in which:—

Fig. 1 is a plan view of the device with some of the parts shewn in section: Fig. 2 is an end elevation of the device shewn in Fig. 1 as seen from the right, some of the parts being omitted; Fig. 3 is an end elevation of a detail; Fig. 4 is a plan of a detail and Fig. 5 is a section and an elevation of another detail on a larger scale. Fig. 6 is a diagrammatic view of a hob of the kind which the improved apparatus is adapted to grind, and Fig. 7 is a partial end elevation of the hob shewn in Fig. 6. Fig. 8 is a section on a larger scale of two teeth of the hob on a plane through the axis and shewing the tooth profile; Figs. 9 and 10 are diagrams illustrating the relief of the teeth.

Referring first to Figs. 6 to 10, the hob, the cutting teeth of which are adapted to be accurately ground to the required dimensions and shape by the improved apparatus, is indicated at 1. It comprises a plurality of teeth $1^a$ similar to a screw thread mutilated by flutings $1^b$ which may be either parallel with the axis of the hob as shewn or may be themselves helically disposed. Referring to Fig. 8, the profile curve $BAB_1$ is the nose of the tooth and BC and $B_1C_1$ are the side faces or flanks of the tooth which in section are straight lines each inclined at an angle to the centre line FG which is at right angles to the hob axis. The helical angle $a$ of the teeth is a function of the pitch $AA_1$ and the diameter of the hob, the faces BC and $B_1C_1$ being also helical along the length of the tooth from the leading edge A to the rear edge E. $C_1DC$ is the root curve connecting two teeth in adjacent convolutions at their bases. HJ is the pitch line of the teeth, the pitch being equal to the longitudinal distance between A and $A_1$. The centre line of the tooth from the leading edge A to the rear edge E does not lie on a circle having its centre at the axis of the hob, but is relieved as shewn in Figs. 7 and 9, that is to say, the outer periphery AE of the tooth does not lie on the addendum circle $AA_2$ but is relieved by an amount $A_2F_2$ where $F_2$ is the point where the curve AE produced cuts the leading face of the next succeeding tooth in the convolution. By a simple process of geometrical development the dimensions of an angle $f$ can be obtained which determines the line along which the hob is moved during the grinding operation as hereinafter explained. Referring to Fig. 10, $FAF_2$ is the angle $f$, $FF_2$ being the helical lead of one tooth, which is equal to the pitch $AA_1$ divided by the number of teeth in one convolution of the hob. The angle $f$ is obviously such that $$\tan f = \frac{EF_2}{AF} = \frac{\text{lead per tooth}}{\text{relief}}$$

Referring now to Fig. 1 to 5 of the drawings, the hob or cutting tool 1 is mounted with a turning fit on an arbor 2 which is supported in accurately formed V-blocks 3, 4, preferably having hardened steel faces 5, (Fig. 2). The V-blocks 3 and 4 are secured to a table 6 movably mounted on the main bed plate 30 as will be hereinafter described in detail, and are provided respectively with caps 7 and 8 adapted to be held in position by means of hinge-pins 9 and removable pins 10. Each cap is provided at the top with a screw 11 carrying a shoe 12 (Fig. 2) adapted to be pressed against the upper surface of the arbor 2 which is thereby securely and accurately retained in the V-blocks. To prevent axial movement of the arbor 2 the latter is provided at its right-hand end (Fig. 1) with a flange 13 engaging the left-hand face of the V-block 4, whilst a cup-shaped distance-piece 13ª with its open end abutting against the other face of the block 4 is secured to the end of the arbor 2 by means of a screw 14. The hob 1 is pressed towards the V-block 4 by means of a spring 3ª disposed between the V-block 3 and a loose collar 2ª.

To obtain the correct angular position of the hob, an index plate 16 is mounted on the arbor 2 adjacent the right-hand end of the hob and conveniently fits into a lateral recess (not shewn) in the hob so that it is keyed to the latter. A plurality of radial slots 17 equal in number to the number of teeth in one convolution of the hob are provided around the periphery of the index plate. A manually retractable plunger 18 is mounted in a bushing 19 in a lever 20 carried upon a hardened bushing 21 on the arbor 2 between the index plate 16 and the flange 13. A spring 23 is provided for urging the plunger 18 into engagement with the slots 17 in the index plate 16. Each slot 17 is formed with an accurately machined lateral face 24 and with an inclined face 25 (see Fig. 5) in order to obtain wedging engagement of and accurate location with respect to the plunger 18. The latter is provided with a knob 26 to enable it to be withdrawn for the purpose of rotating the index plate 16 and consequently also the hob 1 in relation to the lever 20. The lever 20 is rocked by the action of a cam 27 mounted on a shaft 28 supported in bearings 29 on the main bed plate 30 of the apparatus. The shaft 28 is mounted parallel with the axis of the hob 1 and is driven by means of an electric motor 31 or other source of power through the intermediary of bevel gear 32 and worm gear 33. The cam 27 imparts a uniform oscillating motion to the hob 1, the extent of such motion depending upon the number of teeth in a convolution, and the rate of rotation of the cam 27 is selected to obtain efficient grinding action.

As already stated, each tooth is relieved from A to E and to allow for this relief the table 6 carrying the hob 1 is moved in a direction transverse to the hob axis by means of a cam 34, the table 6 being slidably mounted on the bed plate as will be hereinafter described. The cam 34 is also mounted on the shaft 28 and is adapted to engage a friction roller 35 on a bracket 36 at the rear edge of the table 6. The cams 27 and 34 are so timed or disposed relatively to one another that whilst the hob is rotated uniformly through an angle corresponding to the peripheral length of a single tooth the hob is also moved uniformly transversely in accordance with the amount of the relief.

The mounting and method of rotating the grinding wheel will now be described. Referring to Fig. 1, the grinding wheel 40 is secured on a spindle 41 carried in adjustable bearings 42, 43 mounted on brackets 44 and 45 respectively. Ball thrust bearings 46 and 47 are provided at opposite ends of the spindle 41 and an adjusting nut 48 enclosed in a cap 49 is provided to take up longitudinal play. The spindle 41 may be rotated at the requisite speed by means of a belt (not shewn) passing round a pulley 50 secured to the spindle 41. The brackets 44 and 45 carrying the spindle 41 are mounted on a plate 51 which may be rotated in a vertical plane about a horizontal axis in relation to a plate 53, a circular boss on the plate 53 engaging in a circular recess indicated at 52 in the plate 51. Means (not shewn) such as nuts and bolts engaging in a slot are provided for clamping the plate 51 in its adjusted position on the plate 53. The latter may be raised or lowered in relation to a slide 54 by means of a feeding screw and crank handle 55 in the familiar manner. The slide 54 is supported on and is capable of rotation about a vertical axis 56 in relation to a horizontally disposed slide plate 57. A bolt and nut 58 engaging a slot 59 in the slide 54 are provided for clamping the latter in its adjusted position on the plate 57. The plate 57 is adapted to be moved across a slide plate 61 (see Fig. 2) by means of a crank handle 60 and feeding screw (not shewn). The slide plate 61 carrying the above mentioned slides is itself mounted to slide on another plate 63 and is moved by means of a crank handle 64 in a direction at right angles to the movement of the slide 57 obtained by the operation of the handle 60. The plate 63 is mounted on a carriage 65 in such a manner that it can swivel on the latter about a vertical axis passing through the intersection of the centre lines of the slides 57 and 63 and is adapted to be fixed in its adjusted position by means of bolts and nuts 66 engaging slots 67 in the plate 63.

The carriage 65 is itself mounted on a slide 68 on the main base plate 30 and is capable of being moved in a direction parallel with the axis of the hob 1 and the extent of movement of the carriage 65 is such that the grinding wheel 40 may be brought into operation for grinding the teeth throughout the whole length of a hob. The carriage 65 is moved along the slide 68 by means of an adjusting screw 70 mounted in the main bed plate 30 and adapted to be rotated by means of a crank handle 71 (a part of which only is shewn) attached to the left-hand end of the screw. The longitudinal position of the carriage 65 and consequently also of the grinding wheel 40 is accurately determined in relation to individual teeth of the hob by means of a series of what may be called length gauges 72, 73, supported in V-blocks 74 and 75 on the bed plate 30 and adapted to be engaged at one end by means of a hardened stop 76 on the carriage 65 and at the other end to operate a micrometer indicating device. The method of using length gauges and indicating devices of this kind is also fully set forth and illustrated in our application, Serial No. 443,955, filed February 10, 1921. The plunger of the micrometer indicating device 77 is engaged by the longer arm 78 of a two-armed multiplying lever 79 pivoted at 80, the short arm 81 of which lever is engaged by the left-hand end of the gauge 72. The gauges 72 are of different and definite length corresponding precisely to the exact pitch of the teeth of the hob in a longitudinal row, it being necessary to provide one of such gauges for each tooth in a row. A set of additional gauges 73 is also provided corresponding to the lead of each tooth in one convolution.

The appropriate gauges 72 and 73 having been inserted in the V-blocks 74, 75, the carriage 65 may be brought into contact with the gauge by rotating the screw 70 and adjusted so that the micrometer 77 indicates zero. For the purpose of obtaining a fine adjustment the left hand end of the screw 70 may be advantageously provided with worm teeth (not shown) adapted to be engaged by a worm 82 provided with an operating knob 83 and supported in bearings 84 in a bracket 85 which is pivoted at one end to a bracket 86 on the base plate 30 so as to permit the worm 82 to be raised out of engagement with the worm wheel to allow the screw 70 to be rotated by the crank handle 71.

The diamond for truing up the cutting face of the grinding wheel is indicated at 87. It is adjustably mounted in the upper end 88 of a bracket 89 secured to the carriage as shown in Figures 1 and 2 from which it will be observed that the diamond is located in such a position in relation to the grinding wheel 40 that the latter while being rotated may be brought into contact with the diamond for truing the cutting face of the said wheel, and that without altering the adjustment of any of the slides, the wheel may be fed transversely by manipulation of the handle 64 directly into position for grinding a tooth of the hob, the position of the diamond having been accurately determined in relation to the tooth by means of the gauges 72, 73. It will thus be seen that the diamond serves as a datum or basis point for the grinding wheel and it will also be observed that the wheel may be trued up as often as desired without interfering with the adjustment.

The method of obtaining the correct movement of the hob in relation to the grinding wheel will now be described.

The table 6 which is reciprocated transversely by means of the cam 34 is mounted upon a plate 91 having a circular boss engaging a circular recess 92 in the underside of the table 6. The plate 91 is supported on an intermediate plate 91$^a$ and engages the latter by means of a transverse slide groove 90 indicated by dotted lines in Figures 1 and 2 and also shown in Figure 4. The plate 91 is similarly provided with a circular boss engaging a circular recess 93 in the bed plate 30 which arrangement permits the slide 90 to be inclined at any desired angle $f$ to the line KL which is at right angles to the hob axis, whilst the axial direction of the hob is maintained. A bolt and nut 94 engaging a slot 95 in the table 6 are provided for locking the slide plate 91 and table 6 in adjusted position and similar means including the slot 91$^b$ (Figure 1) are provided for locking the plate 91$^a$ to the bed plate 30. The angle $f$ which the slide 90 makes with the transverse line KL varies with different hobs and as already explained must be a function of the lead per tooth and the amount of the relief, that is, the hob is given a transverse motion equal to the amount of the relief and is simultaneously given a longitudinal motion equal to the lead per tooth. The lever 20 is maintained in contact with the cam 27 by means of a spring 97 secured to the table 6 and the roller 35 of the table 6 is retained in contact with the cam 34 by means of a cord 98 (Figure 2) which is secured to the table 6 and passing over a pulley 99 is provided with a weight 100.

The improved grinding apparatus is used in the following manner:—

The correct outside diameter of the hob is determined by a standard gauge and then obtained by a rotary grinding machine in a manner well known to those skilled in the art of hob making. The hob mounted on the arbor 2 is then placed in the V-blocks 3 and 4 and retained therein by means of the screw pressed shoes 12 in the caps 7, endwise movement of the arbor being prevented by means of the flange 13 and the distance piece 13$^a$, whilst the spring 3$^a$ retains the flange 13, the bushing 21, the index plate 16 and the hob in close contact. The dimensions of the hob being known, including the amount of the relief, the slide 90 is set at angle $f$ to the transverse line KL, the longitudinal positions of the hob being retained and suitable cams 27 and 34 corresponding respectively to the circular pitch and to the relief of a tooth are employed. A grinding wheel having a curved cutting face corresponding to the required profile of the nose or curved portion BAB$_1$ of the tooth is secured to the spindle 41.

The longitudinal position of the grinding wheel in relation to any one of the teeth, for example, the first tooth to be ground, is then determined by means of the appropriate length gauges 72, 73 the grinding wheel being so adjusted by the combination of slide rests upon which it is carried that the axis of the hob and the curve of contact between the hob tooth and the wheel are in the same horizontal plane, the spindle 41 being set obliquely to the hob axis at an angle equal to the helical angle $a$. The slide 63 is adjusted to bring the wheel adjacent the hob tooth, the cam shaft 28 being then set in rotation to produce the oblique and angular motions of the hob and the nose portion BAB$_1$ of the tooth is thereby ground. To grind other teeth in a longitudinal row appropriate length gauges 72 are employed. In order to grind teeth in another longitudinal row the plunger 18 is withdrawn from the index plate 16 and the hob is manually rotated until the slot 17 corresponding to the row of teeth to be ground is opposite the plunger 18 which is then released and secures the hob with the other row of teeth presented to the grinding wheel. Another of the gauges 73 is employed and the gauges 72 are used as before.

In order now to grind the relieved side contours or flanks of the teeth the grinding wheel for cutting the nose of the teeth is removed and a wheel suitable for grinding the straight line faces BC and B$_1$C$_1$ is substituted therefor. The plate 63 is rotated on the carriage 65 to an angle $d$ to the transverse line MN, the slide 54 being then adjusted on the plate 57 so that the spindle 41 is inclined to the hob axis, the centre of the wheel being still in the same horizontal plane as the axis of the hob. The longitudinal position of the grinding wheel is obtained by inserting the requisite length gauge 72 corresponding to the tooth in a row and the requisite gauge 73 corresponding to the row of teeth it is desired to grind, the final accuracy of the adjustment being obtained by means of the worm 82 with the aid of the micrometer 77. The grinding face of the wheel is now brought into contact with the diamond 87 by rotating the handle 64 and the said face may be trued up, if necessary, before the actual grinding operation. Without disturbing the adjustment the grinding wheel is then traversed directly from the diamond along the dot and dash line in Fig. 1 into contact with the tooth of the hob by rotating the handle 64 in the reverse direction. The cam shaft 28 rotates as before and the cutting face of the grinding wheel is fed along the straight contour BC (Fig. 8) by turning the handle 64. The relief of the said faces of the teeth is obtained by means of the cam 34 and the slide 90. To grind the opposite faces B$_1$C$_1$ the slide rests are readjusted so that the cutting face is correctly and similarly presented to the other side of the diamond 87 and the other sides of the teeth after which the procedure is the same as before.

With the apparatus above described, it will be seen that it is possible to grind with precision the exact peripheral dimensions of every tooth of a hob with suitable relief curvatures. It will also be noticed that the accuracy of the pitch or position of the hob teeth, which is of the greatest importance, does not depend upon the accuracy of a lead screw which is subject to inaccuracy in manufacture and being soft is liable to wear, but on simple hardened length gauges which can be made with ease to the highest degree of accuracy.

Furthermore, an important feature consists in the fact that it is possible at any time to withdraw the grinding wheel from a tooth which is being cut and to have it trued up against the diamond and return it to the said tooth or to another tooth without any possibility of its position in the meantime being relatively moved.

Although the apparatus has been described in connection with the grinding of hobs having straight flutings parallel with the axis, hobs having spiral flutings may be similarly ground by using a suitable combination of index plates 16 and length gauges 72 and 73.

It will be understood that various modifications may be made in the construction of the apparatus without departing from the scope of the invention. For example, means other than those described may be used for oscillating and transversely reciprocating the hob, and for obtaining the obliquity of such reciprocation.

We claim as our invention:—

1. The method of grinding the teeth of hobs and like gear cutting tools which consists in locating a rotating grinding wheel for grinding an individual tooth in relation to the other teeth of the hob by means of gauges of definite lengths and oscillating the hob through the peripheral length of one tooth.

2. The method of grinding the teeth of hobs and like gear cutting tools which consists in locating a rotating grinding wheel in relation to individual teeth of the hob, for each tooth oscillating the hob through an angle equivalent to the peripheral length of one tooth and simultaneously transversely reciprocating the hob through the extent of the relief of the teeth whilst longitudinally reciprocating it through an extent equal to the lead per tooth.

3. Apparatus for grinding the teeth of hobs and like gear cutting tools comprising a support for the hob, interconnected means for oscillating the hob and for reciprocating it laterally, a rotary grinding wheel, an adjustable support by which said wheel can be presented to the hob, means for moving said wheel support parallel with the hob axis, and length gauges for determining the position of said grinding wheel support relative to individual teeth of the hob.

4. In apparatus for grinding the teeth of hobs and like gear cutting tools as claimed in claim 3, an index plate and plunger for presenting different rows of hob teeth to the grinding wheel, substantially as described.

5. The method of grinding the teeth of hobs and like gear cutting tools which consists in locating a rotating grinding wheel for grinding an individual tooth in relation to the other teeth of the hob by means of gauges of definite lengths.

6. Apparatus for grinding the teeth of hobs and like gear cutting tools as claimed in claim 3, in which the hob support is carried upon a slide which can be set at an angle with the line perpendicular to the axis of the hob so that the hob can be moved simultaneously both transversely and longitudinally while a tooth is being ground, substantially as described.

7. In a grinding machine, the combination of a work holder for holding a member having a plurality of longitudinally extending rows of teeth which are inclined peripherally, means for oscillating the work holder the peripheral length of the teeth ground, grinding mechanism, length-gauge mechanism to secure adjustment of the grinding mechanism to different positions longitudinally of the work holder in order that teeth of a row may be ground, and indexing mechanism for setting the member circumferentially so that any row of teeth thereon will be disposed for grinding.

8. In a grinding machine, the combination of an arbor for holding a hob or the like having longitudinal rows of teeth to be ground, means for oscillating the arbor, means for communicating translatory movement to the arbor, grinding mechanism, and means for adjusting the grinding mechanism longitudinally with respect to the arbor in order that the grinding mechanism may be brought into position to grind any tooth in a longitudinal row on the hob.

9. In a grinding machine, the combination of a work holder for holding a hob or the like to be ground, means for oscillating the holder in accordance with the peripheral length of the teeth to be ground, means for translating the holder both longitudinally and transversely, a rotary grinder disposed adjacent to the holder, a carriage for the grinder, a stationary support, an indicating instrument carried by said support, and length gauges for interposition between the indicating instrument and the carriage.

10. In a grinding machine, the combination of a rotary grinder for grinding teeth on hobs or the like and means for adjusting the grinder to different positions including a series of length gauges which differ in length by an increment corresponding to the pitch of the teeth ground.

11. In a grinding machine, the combination of grinding mechanism for grinding teeth on a hob or the like, a carriage for supporting the grinding mechanism, and length gauge mechanism for determining the positions of adjustment of the carriage including length gauges which differ in length by an increment corresponding to the pitch of the teeth ground.

12. In a grinding machine, the combination of grinding mechanism for grinding teeth on hobs or the like, a carriage for supporting the grinding mechanism, means for moving the carriage longitudinally, and means for determining the longitudinal positions of adjustment of the carriage including length gauges which differ in length by an increment corresponding to the pitch of the teeth ground and other length gauges which differ in length by an increment corresponding to the difference in lead of adjacent tooth segments.

13. In a grinding machine, the combination of grinding mechanism for grinding spirally arranged and mutilated teeth on an arbor, a carriage for supporting the grinding mechanism, and means for determining the longitudinal positions of adjustment of the carriage including a series of length gauges which differ in length by an increment corresponding to the pitch of the teeth ground and another series of cooperating length gauges which differ in length by an increment corresponding to the difference in lead of adjacent tooth segments of the same convolution.

14. In a machine for cutting helically-disposed teeth on a cylindrical blank, the combination of cutting mechanism, means for moving the cutting mechanism parallel to the blank, means for feeding the cutting mechanism in a straight line obliquely of the blank, and means for imparing rotary and translatory movements to the blank.

15. In a machine for cutting helically-disposed teeth on a cylindrical blank, the combination of cutting mechanism, means for moving the cutting mechanism parallel to the blank, length-gauge mechanism to secure adjustment of the cutting mechanism in different predetermined positions parallel to the blank, means for feeding the cutting mechanism in a straight line obliquely of the blank, and means for imparting rotary and translatory movements to the blank.

16. A process for grinding a hob which consists in setting a tool longitudinally of the hob for the convolutions of teeth thereof by a series of length gauges which differ in length by an increment corresponding to the pitch of the hob teeth and for the teeth of each convolution by a series of length gauges which differ in length by an increment corresponding to the difference in lead of adjacent teeth of a convolution.

In testimony whereof we have hereunto subscribed our names this 8th and 15th days of June, 1921.

HOLBERRY MENSFORTH.
FREDERICK ARTHUR COWELL.